(12) United States Patent
Stahl

(10) Patent No.: US 9,152,022 B2
(45) Date of Patent: Oct. 6, 2015

(54) TECHNIQUES FOR ADJUSTING A PROJECTED IMAGE

(71) Applicant: Michael Stahl, Jerusalem (IL)

(72) Inventor: Michael Stahl, Jerusalem (IL)

(73) Assignee: INTEL CORPORATION, Santa Clara, CA (US)

( * ) Notice: Subject to any disclaimer, the term of this patent is extended or adjusted under 35 U.S.C. 154(b) by 140 days.

(21) Appl. No.: 13/939,823

(22) Filed: Jul. 11, 2013

(65) Prior Publication Data

US 2015/0015796 A1 Jan. 15, 2015

(51) Int. Cl.
*G03B 21/14* (2006.01)
*H04N 9/31* (2006.01)

(52) U.S. Cl.
CPC ............ *G03B 21/147* (2013.01); *H04N 9/3179* (2013.01); *H04N 9/3194* (2013.01)

(58) Field of Classification Search
CPC ...... G03B 21/14; G03B 21/28; G03B 21/147; H04N 9/3185; H04N 9/3194; H04N 9/3197
USPC ............ 353/30, 38, 69–70, 79; 348/743–747; 349/5, 7–9
See application file for complete search history.

(56) References Cited

U.S. PATENT DOCUMENTS 7,457,458 B1 * 11/2008 Daniel et al. .................. 382/159
7,607,783 B2 * 10/2009 Sakurai et al. .................. 353/70
8,807,762 B2 * 8/2014 Uchiyama et al. .............. 353/69
2005/0036117 A1 * 2/2005 Kobayashi ...................... 353/70
2006/0181686 A1 8/2006 Matsuda
2009/0096994 A1 * 4/2009 Smits ............................... 353/30
2009/0115916 A1 5/2009 Kondo et al.
2009/0213335 A1 * 8/2009 Kondo et al. ................... 353/30
2011/0007283 A1 * 1/2011 Tanaka ............................ 353/70
2012/0105813 A1 * 5/2012 Todoroki ........................ 353/69

FOREIGN PATENT DOCUMENTS

WO 2008020340 A1 2/2008

OTHER PUBLICATIONS

European Search Report received in European Patent Application No. 14176512.3, Dated Dec. 19, 2014, 8 pages.

* cited by examiner

*Primary Examiner* — Sultan Chowdhury
(74) *Attorney, Agent, or Firm* — Finch & Maloney PLLC

(57) ABSTRACT

Techniques are disclosed for compensating for deficiencies of a given image projector so as to eliminate or otherwise reduce discrepancies between original image data provided to the projector and the actual image projected by the projector. The techniques also may be used to enhance an attribute of the original image data to improve the image projected by the projector. The techniques can be implemented, for instance, with an imaging capture device and an image comparison engine. In operation, the imaging capture device can capture a projected image from a viewing surface, and the image comparison engine can compare the original image data with the projected image captured by the imaging capture device. Based on the results of this comparison, an adjustment then can be made to achieve the desired projected image. The adjustment may entail, for example, adjusting the original image data provided to the projector and/or adjusting projector settings.

25 Claims, 9 Drawing Sheets

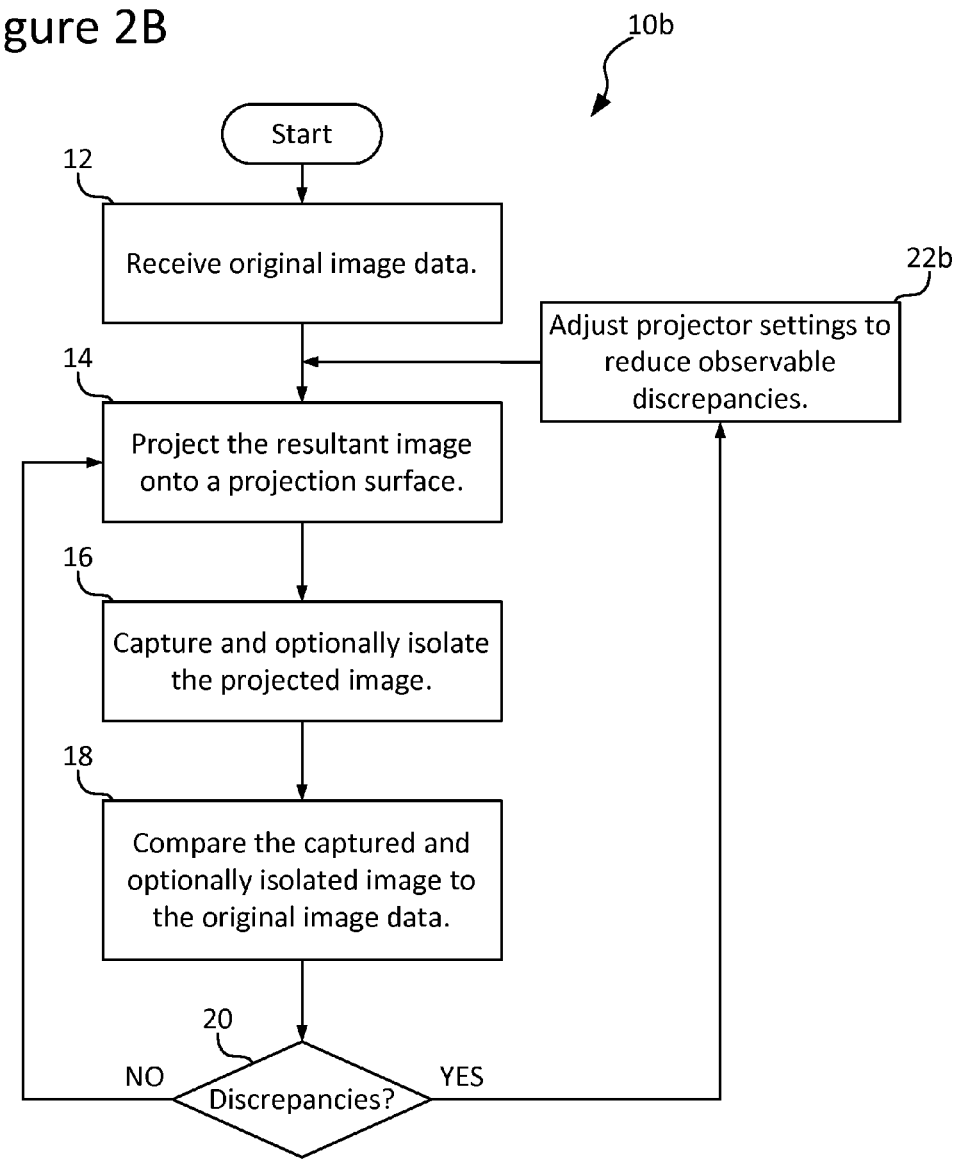

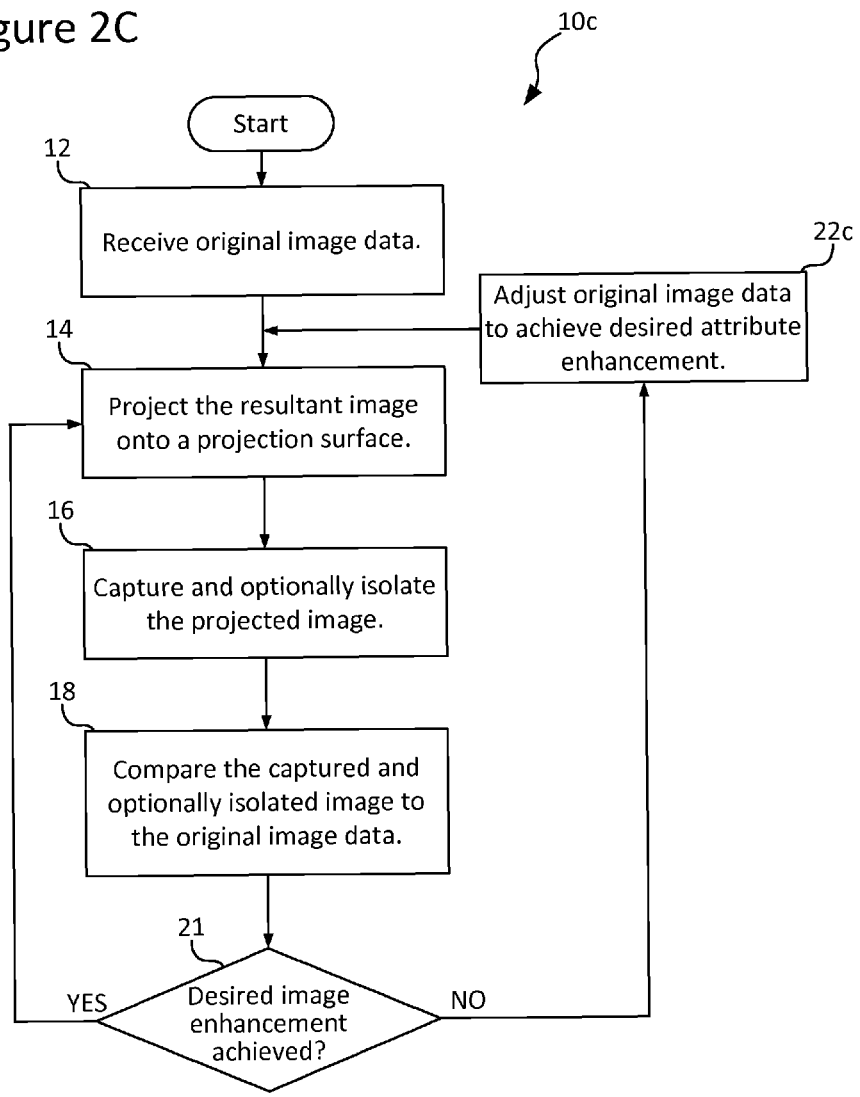

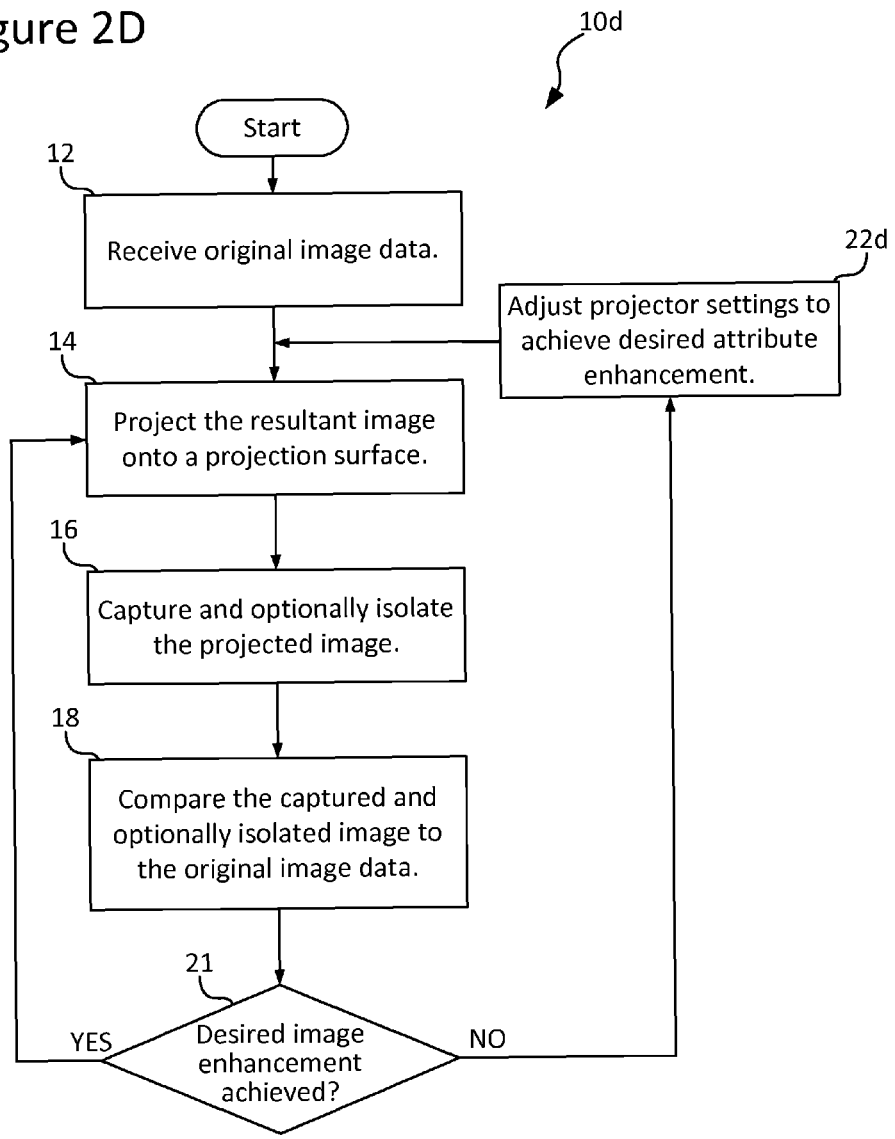

TECHNIQUES FOR ADJUSTING A PROJECTED IMAGE

BACKGROUND

Image projection involves a number of non-trivial challenges, and projection systems have faced particular complications with regard to image reproduction.

BRIEF DESCRIPTION OF THE DRAWINGS

FIG. 2B is a flow diagram illustrating an algorithm for reducing projected image discrepancies, in accordance with another embodiment of the present disclosure.

FIG. 2C is a flow diagram illustrating an algorithm for enhancing a projected image attribute, in accordance with an embodiment of the present disclosure.

FIG. 2D is a flow diagram illustrating an algorithm for enhancing a projected image attribute, in accordance with another embodiment of the present disclosure.

DETAILED DESCRIPTION

Figure 1A:
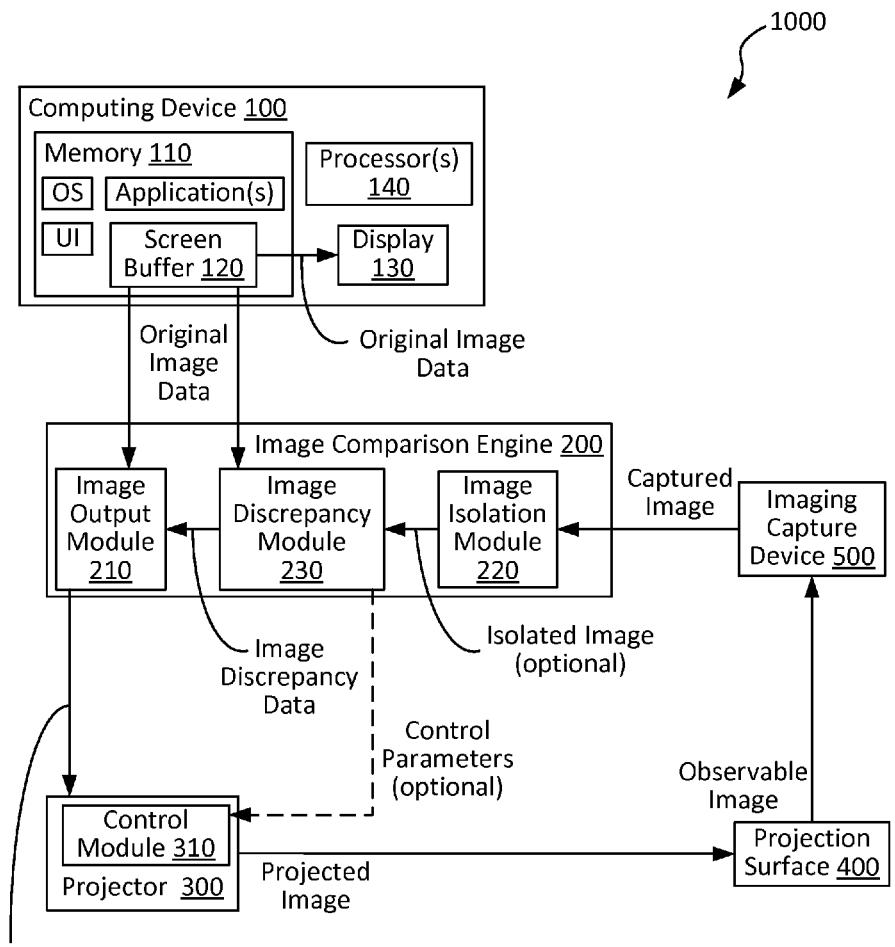
FIG. 1A illustrates an example image projection system configured in accordance with an embodiment of the present disclosure.

Techniques are disclosed for compensating for deficiencies of a given image projector so as to eliminate or otherwise reduce discrepancies between original image data provided to the projector and the actual image projected by the projector. The techniques also may be used to enhance an attribute of the original image data to improve the image projected by the projector. The techniques can be implemented, for instance, with an imaging capture device, such as a video or still camera, and an image comparison engine. In operation, the imaging capture device can capture a projected image from a given viewing surface, and the image comparison engine is configured to compare the original image data provided to the projector with the projected image captured by the imaging capture device. Based on the results of this comparison, an adjustment then can be made so as to mitigate undesired discrepancies. For example, in one embodiment, this adjustment entails adjusting the original image data provided to the projector to compensate for one or more projector deficiencies so that the actual image projected by the projector more closely matches the original image represented by the original image data. Alternatively, or in addition, the adjustment may entail adjusting the settings of the projector so that the actual image projected by the projector more closely matches the original image represented by the original image data. In some other cases, the results of the comparison can be used in making an adjustment to achieve a given target image. For example, in one embodiment, this adjustment may entail adjusting the original image data provided to the projector to enhance a given attribute of the image. In another embodiment, the adjustment may entail adjusting the projector settings to enhance a given attribute of the image. In any case, the discrepancy being corrected or attribute being enhanced may be, for example, with respect to image color (e.g., one or more of hue, tint, shade, tone saturation, lightness, chroma intensity, luma brightness, luminance, etc.), image contrast, image resolution, image aspect ratio, and/or any other image parameter or property that can be distorted by the projection pathway. The techniques can be implemented in hardware and/or software, such as in a software application executable on a computing device that provides the original image data to the projector, or in the hardware of the projector itself. Numerous configurations and variations will be apparent in light of this disclosure.

General Overview

As previously indicated, there are a number of non-trivial issues that can arise which can complicate image reproduction in a projection system. For instance, there are a number of factors which can impart distortive effects on the original image to be projected and thus contribute to discrepancies between the original image provided to the projection system and the observable image actually projected by the projection system. For example, the projector can impart distortive effects as a consequence of lamp aging (e.g., a projector can lose its color balance over time as its lamp ages), poor calibration (e.g., an unadjusted/maladjusted projector can distort image color, resolution, and aspect ratio), and misaligned projection angle (e.g., which can produce a skewed image or otherwise affect the image resolution and proportions). Also, the color, texture, and curvature of the projection surface on which the image is projected can impart distortive effects. Furthermore, distortive effects can be imparted by the ambient environment as the projected image is transmitted there through, as caused by the color/tinge and intensity of the ambient light. In any case, discrepancies between the original image and the observable image can manifest as disparities in color, resolution, and aspect ratio, among others. Another non-trivial issue pertains to the fact that manual adjustment of the projector's configuration settings is not always an available or realistic option. For instance, the user may not have access to the projector's calibration menu or sufficient experience to know which settings to adjust to correct for observed discrepancies. In some instances, there may be insufficient time to determine and perform the requisite adjustments (e.g., the presentation or other display of content/information already has begun). Still further, manual adjustment of the projector does not account for the distortive effects of the projection environment and the projection surface.

Thus, and in accordance with an embodiment of the present disclosure, techniques are disclosed for performing real-time adjustments to a projected image. In some embodiments, the techniques can be implemented, for example, in an image projection system including an image data source (e.g., such as a personal computer or other computing device), a projector and projection surface, an imaging capture device (e.g., such as a still camera or a video camera), and an image comparison engine configured as described herein. The image comparison engine can be implemented, for example, anywhere along the data path from the image data source to the display hardware of the projector. In some cases, for example, the image comparison engine is incorporated within the computing device which outputs the image data to be received by the projector, while in some other cases it is incorporated within the projector. In some still other cases, the image comparison engine may be a stand-alone component configured to communicate with the projector and the image data source. In still other embodiments, the image comparison engine may be implemented in a combination of locations, such as the example case where comparison functionality is implemented in the projector hardware and/or firmware, as well as a software application executable on the computing device that provides the image data to the projector. Numerous other embodiments having some degree of functional distributedness will be apparent in light of this disclosure.

The image comparison engine can be programmed or otherwise configured to determine discrepancies between the original image and the observable image (e.g., as captured from the projection surface by the imaging capture device and optionally isolated). In some such embodiments, the described image comparison engine may be further configured to utilize the resultant image discrepancy data in pre-distorting the original image signal before receipt thereof by the display hardware of the projector. In such a case, the type and degree of pre-distortion may be made in a manner which offsets or otherwise compensates, in part or in whole, for distortive effect(s) subsequently imparted, for example, by the projector, by the projection surface, by the cabling or other pathway between the projector and computing device, and/or by the surrounding environment. In other embodiments, the image comparison engine may be configured to utilize the resultant image discrepancy data in outputting a signal to the projector which provides for remote and/or internal adjustments to the configuration settings of the projector. In such cases, the projector may be adjusted to compensate, in part or in whole, for distortive effect(s) imparted through the imaging data flow. Thus, the results generated by the image comparison engine can be used to adjust the image data signal provided to the projector or to adjust the projector itself, and the comparison may be carried out in hardware, firmware, and/or software.

As will be appreciated in light of this disclosure, the techniques provided herein may be used to provide for closed-loop feedback on discrepancies between the actual observable image (e.g., as output by a projector, transmitted through the surrounding environment, and displayed on a projection surface) and the original image data. This discrepancy information can be utilized, in accordance with some embodiments, in performing real-time adjustments to minimize or otherwise reduce such discrepancies. Thus, extemporal or on-the-fly control and adjustment of the observable image may be provided, for example, one or more times during a given projection session.

Numerous applications and uses will be appreciated in light of this disclosure. For instance, the techniques can be used to provide real-time corrective or otherwise compensatory adjustments to the image signal and/or to the projector settings/configuration to account for distortive effect(s) imparted by the projection system and the surrounding environment. In some example cases, the disclosed techniques can be used to address issues regarding color reproduction (e.g., to compensate for color balance loss experienced by a projector), poor contrast (e.g., as between text and a background image), resolution mismatch, and/or aspect ratio mismatch to achieve a desired degree of image reproduction using a given image projection system. Note that the resulting compensation need not eliminate all imperfections in the projected image or otherwise achieve a perfect match for any one image quality or attribute (e.g., one or more of color, hue, tint, shade, tone saturation, lightness, chroma intensity, luma brightness, luminance, contrast, resolution, aspect ratio, etc.). In some cases, and in accordance with some embodiments, an adjustment to the original image data and/or projector settings may be made to enhance a given attribute of the image so as to achieve a given target image. Some embodiments can provide adjustments which account for the distortive effect(s), if any, of ambient lighting in the surrounding environment. Numerous suitable uses and applications of the disclosed techniques will be apparent in light of this disclosure.

Furthermore, and in accordance with an embodiment, a projection system provided using the disclosed techniques can be configured, for example, as: (1) a partially/completely assembled system; and/or (2) a kit or other collection of discrete components (e.g., computing device, image comparison engine, projector, imaging capture device, etc.) which may be operatively coupled as desired. Also, and in accordance with an embodiment, use of the disclosed techniques may be detected, for example, by visual or performance inspection of a given projector, computing device, or projection system that utilizes image comparison techniques provided herein.

System and Operation

FIG. 1A illustrates an example image projection system 1000 configured in accordance with an embodiment of the present disclosure. As can be seen, system 1000 includes a computing device 100, an image comparison engine 200, a projector 300, a projection surface 400, and an imaging capture device 500. Device 100 can be any computing device, mobile or otherwise, which utilizes a graphics processing unit (GPU) or other graphics sub-system and which is configured to output an image signal, as will be apparent in light of this disclosure. For instance, computing device 100 may be or otherwise include: a laptop/notebook computer; a tablet computer; a mobile phone or smartphone; a personal digital assistant (PDA); a cellular handset; a handheld gaming device; a gaming platform; a desktop computer; and/or a videoconferencing system. Also, computing device 100 can be configured for wired (e.g., Universal Serial Bus or USB, Ethernet, FireWire, etc.) and/or wireless (e.g., Wi-Fi®, Bluetooth®, etc.) communication, for example, with one or more other portions of system 1000 (e.g., image comparison engine 200, projector 300, projection surface 400, imaging capture device 500, etc.). Other suitable types and configurations for computing device 100 will depend on a given application and will be apparent in light of this disclosure.

Computing device 100 includes memory 110. Memory 110 can be of any suitable type (e.g., RAM and/or ROM, or other suitable memory) and size, and in some cases may be implemented with volatile memory, non-volatile memory, or a combination thereof. Memory 110 may be utilized, for example, for processor workspace and/or to store media, programs, applications, content, etc., on device 100 on a temporary or permanent basis. Also, memory 110 can include a number of modules stored therein that can be accessed and executed, for example, by the processor(s) 140 of device 100. For instance, computing device 100 may include an operating system (OS) module, for example, to aid in processing imaging data during its flow through system 1000. The OS module can be implemented with any suitable OS, mobile or otherwise (e.g., Android® OS from Google, Inc.; iOS® from Apple, Inc.; Windows Phone® OS from Microsoft Corp.; etc.), as will be apparent in light of this disclosure. Also, computing device 100 may include a user interface (UI) module, for example, to aid in carrying out the image color adjustment techniques, as variously described herein. The UI module can be implemented in memory 110 (e.g., as shown in FIG. 1A) or in a combination of locations (e.g., memory 110, display 130, a touch-sensitive controller, etc.), thereby providing the UI module with a degree of functional distributedness. Furthermore, computing device 100 may include or otherwise have access to an application or other software, for example, which permits playback/viewing of images, video, text, or other content. In some instances, the application(s) may be stored in memory 110. Memory 110 also may include a screen buffer 120, discussed below. Other suitable configurations for memory 110 will depend on a given application and will be apparent in light of this disclosure.

In any case, the modules of memory 110 can be implemented, for example, in any suitable programming language, such as C, C++, objective C, JavaScript, custom or proprietary instruction sets, etc. The modules can be encoded, for example, on a machine-readable medium that, when executed by the processor, carries out the functionality of device 100. The computer-readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 110 can be implemented in hardware, software, and/or firmware, as desired.

A portion of memory 110 can be configured, for example, as a screen buffer 120. Screen buffer 120 can be of any suitable type and size, as will be apparent in light of this disclosure. Also, and in accordance with an embodiment, screen buffer 120 may be configured to output image data (e.g., images, video, text, or other content), for example: (1) to display 130 where it may be viewed, for instance, by a user or other observer; and/or (2) to image comparison engine 200 (discussed below). In some cases, the image data may be obtained from a file (e.g., word processing document, slideshow presentation, etc.) or data stream (e.g., online streaming content) that is hosted or otherwise accessible by computing device 100. Other suitable configurations for screen buffer 120 will depend on a given application and will be apparent in light of this disclosure.

Display 130 can be any display or other suitable device on which images, video, text, or other content can be displayed, as will be apparent in light of this disclosure. In some cases, the original image data, as provided by screen buffer 120, may be viewed at display 130. Display 130 optionally may be touch-sensitive (e.g., to assist with the function of the UI module of device 100, as discussed above), in some cases. Also, in some embodiments, display 130 can be integrated with device 100. In some other embodiments, however, display 130 may be a stand-alone component configured to communicate with screen buffer 120 using any of the wired and/or wireless communications noted above with respect to computing device 100. Numerous suitable configurations for display 130 will be apparent in light of this disclosure.

Figure 1B:
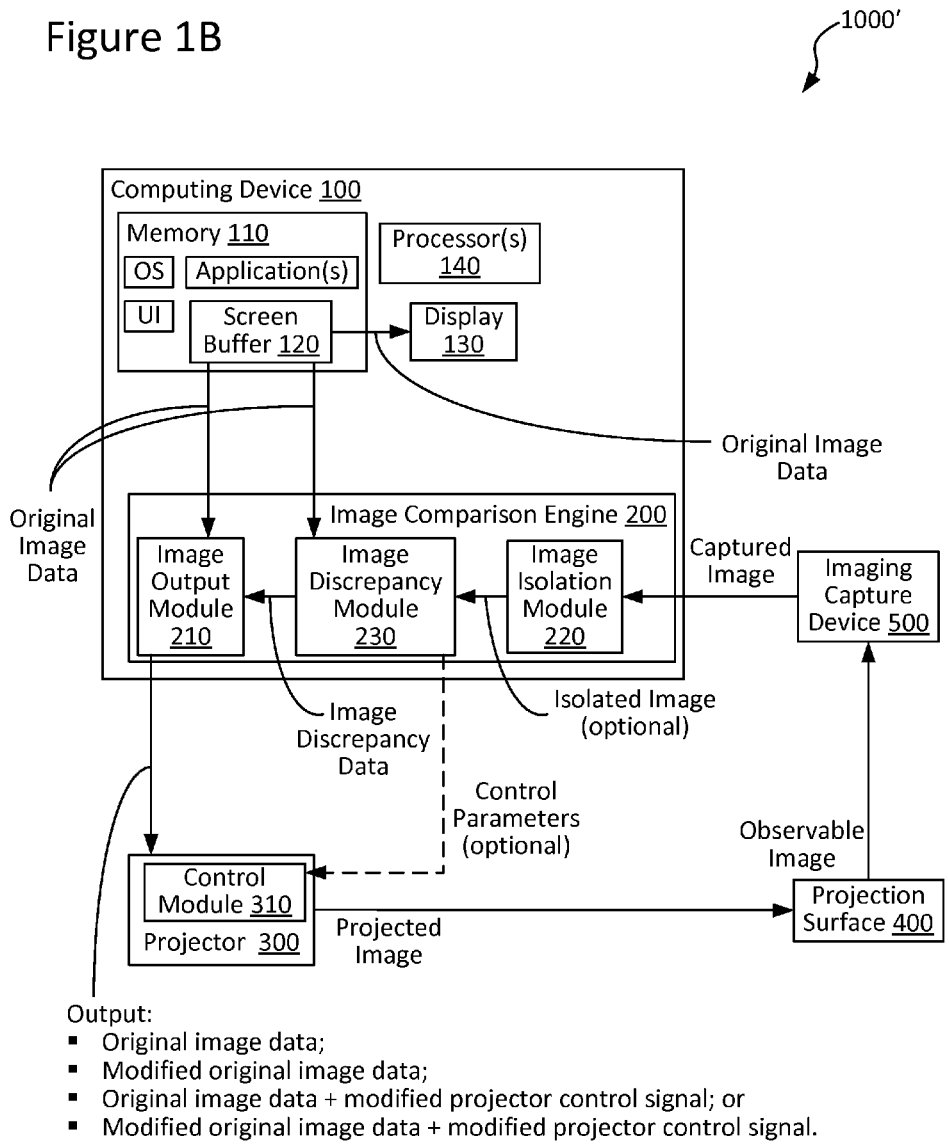
FIG. 1B illustrates an example image projection system configured in accordance with another embodiment of the present disclosure.
Figure 1C:
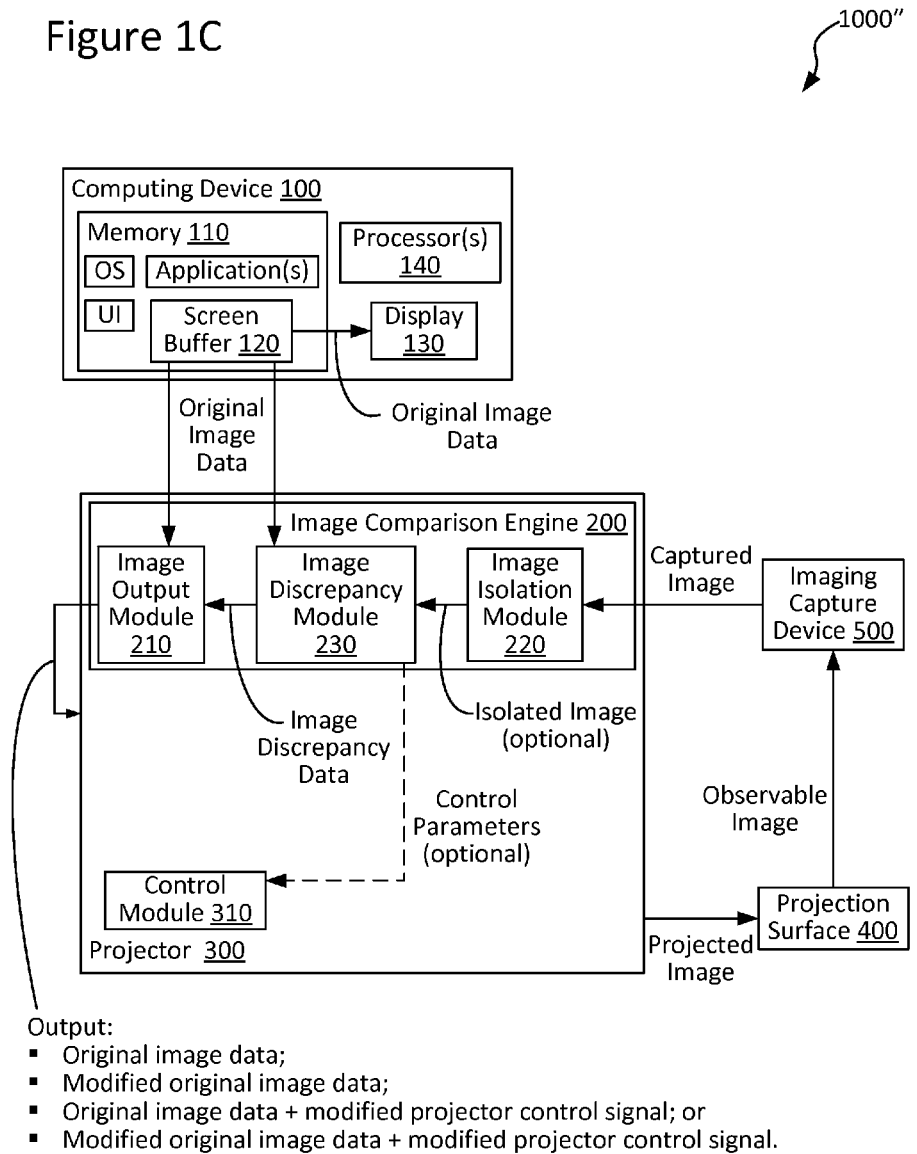
FIG. 1C illustrates an example image projection system configured in accordance with another embodiment of the present disclosure.

As previously noted, image comparison engine 200 may receive original image data from screen buffer 120 of computing device 100. In accordance with some embodiments, image comparison engine 200 may be configured to bypass and/or process the original image data. To these ends, image comparison engine 200 can include a number of modules stored therein that can operate on the imaging data during its flow through system 1000. For instance, and in accordance with some embodiments, image comparison engine 200 may include an image output module 210, an optional image isolation module 220, and an image discrepancy module 230, each of which is discussed below. In some cases, image comparison engine 200 can be a stand-alone component of system 1000 (e.g., as is generally illustrated in FIG. 1A). In some other embodiments, however, image comparison engine 200 may be integrated, in part or in whole, with computing device 100, such as shown by system 1000' in FIG. 1B. In some still other embodiments, image comparison engine 200 may be integrated, in part or in whole, with projector 300, such as shown by system 1000" in FIG. 1C. Numerous configurations and varying degrees of integration of the functional portions of image comparison engine 200 will be apparent in light of this disclosure.

In any case, a given module of image comparison engine 200 can be implemented, for example, in any suitable programming language, such as C, C++, objective C, JavaScript, custom or proprietary instruction sets, etc. The modules can be encoded, for example, on a machine-readable medium that, when executed by a processor, carries out the desired functionality of that portion of image comparison engine 200. The computer-readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chipset or other such purpose-built logic. Some embodiments can be implemented with a microcontroller having input/output capability (e.g., inputs for receiving user inputs; outputs for directing other components) and a number of embedded routines for carrying out a given desired functionality. In a more general sense, the functional modules of image comparison engine 200 can be implemented in hardware, software, and/or firmware, as desired.

As can be seen from FIG. 1, image output module 210 can be configured, for example: (1) to receive original image data from screen buffer 120; and (2) to receive image discrepancy data from upstream image discrepancy module 230 (discussed below). Image output module 210 may include custom, proprietary, known, and/or after-developed image/video processing code or instruction sets that are generally well-defined and operable to output data, for example, to projector 300. In some cases, the output of image output module 210 may include the original image data and/or adjusted image data to be projected by projector 300 onto projection surface 400, both of which are discussed below. In some instances, the image to be projected may be the original image data provided by screen buffer 120; thus, in this sense, image output module 210 may function as a bypass for delivery of the original image data from computing device 100 to projector 300. In some other instances, however, the image to be projected may be a version of the original image data which has undergone modification, for example, by image output module 210 using image discrepancy data provided by image discrepancy module 230, as discussed below. Thus, in this sense, image output module 210 may function to modify/alter the original image data on its way from computing device 100 to projector 300. In some cases, and in accordance with some embodiments, adjustments to the original image data (e.g., color, resolution, aspect ratio, etc.) may be made by image output module 210, as described herein. In some other embodiments, the output of image output module 210 optionally may include control parameters to be relayed to control module 310 of projector 300.

Projector 300 can be any device configured to project images, video, text, or other content onto a desired display surface (e.g., projection surface 400). To that end, projector 300 can utilize any projection technology (e.g., cathode ray tube, or CRT; liquid-crystal display, or LCD; digital light processing, or DLP; liquid crystal on silicon, or LCOS; light-emitting diode, or LED; etc.), and can be of any suitable type (e.g., front projection; back projection; etc.) and display resolution (e.g., super video graphics array, or SVGA; extended graphics array, or XGA; 720 p; 1080 p; etc.), as desired for a given target application or end-use. In some embodiments, projector 300 may include a control module 310 which is configured to control various functions of projector 300 (e.g., color, focus, zoom, etc.). Other suitable configurations for projector 300 will depend on a given application and will be apparent in light of this disclosure.

In accordance with an embodiment, projector 300 may receive from image comparison engine 200 (e.g., from image output module 210 thereof) a signal including an image to be projected thereby and may be configured to project that image, for example, onto projection surface 400. In some embodiments, projection surface 400 can be, for instance, a projection screen of any suitable type (e.g., mobile or permanent; planar or non-planar/curved; front projection or back projection; etc.) and size, as will be apparent in light of this disclosure. In some other embodiments, however, projection surface 400 may be a surface other than a projection screen, such as a wall, ceiling, dome, or any other surface upon which an image may be projected for viewing. In some cases, projection surface 400 can be, for example, an interactive whiteboard or other interactive display, as will be apparent in light of this disclosure. Numerous suitable configurations for projection surface 400 will be apparent in light of this disclosure.

Imaging capture device 500 can be any device configured to capture digital images, such as a still camera (e.g., a camera configured to capture still photographs) or a video camera (e.g., a camera configured to capture moving images comprising a plurality of frames). In some cases, imaging capture device 500 may include components such as, but not limited to, an optics assembly, an image sensor, and/or an image/video encoder. These components (and others, if any) of imaging capture device 500 may be implemented in any combination of hardware, software, and/or firmware, as desired for a given target application or end-use. Imaging capture device 500 can be configured to operate using light, for example, in the visible spectrum or with other portions of the electromagnetic spectrum not limited to the infrared (IR) spectrum, ultraviolet (UV) spectrum, etc. Numerous suitable configurations for imaging capture device 500 will be apparent in light of this disclosure.

In accordance with an embodiment, imaging capture device 500 can be configured (e.g., aimed, oriented, focused, etc.) such that it captures an image inclusive of the observable image on projection surface 400. Thus, the captured image (e.g., captured by imaging capture device 500) may include, for example, the projected image as observable on projection surface 400, as well as some portion of the environment surrounding (e.g., immediately surrounding or otherwise proximate) the projected image as incident with projection surface 400. Also, and in accordance with an embodiment, imaging capture device 500 may be configured to deliver the captured image to image comparison engine 200 for analysis and processing, where discrepancies (if any) between the original image data and the observable image can be determined (as discussed below). To this end, it may be desirable to ensure that imaging capture device 500 is of adequate resolution for image comparison (e.g., for determination of discrepancies between the original imaging data provided by screen buffer 120 and the observable image as captured and optionally isolated from projection surface 400), as described herein.

In some cases, imaging capture device 500 may be incorporated or otherwise integrated with another portion of system 1000. For instance, in some embodiments, computing device 100 may have a built-in or otherwise on-board imaging capture device 500. Some example cases may include: web cameras as may be associated with computers, video monitors, etc.; mobile device cameras (e.g., cell phone or smartphone cameras integrated in, for example, the previously discussed example device); integrated laptop computer cameras; and integrated tablet computer cameras (e.g., iPad®, Galaxy Tab®, and the like). In some other embodiments, projector 300 may have a built-in or otherwise on-board imaging capture device 500. However, the present disclosure is not so limited. For instance, in some other cases, imaging capture device 500 may be a stand-alone component configured to communicate with one or more other portions of system 1000 using any of the wired and/or wireless communications noted above with respect to computing device 100. Numerous suitable configurations will be apparent in light of this disclosure.

In accordance with an embodiment, the captured image (e.g., of projection surface 400, as acquired by imaging capture device 500) may be delivered to optional image isolation module 220. Image isolation module 220 may include custom, proprietary, known, and/or after-developed image/video processing code or instruction sets that are generally well-defined and operable to isolate the observable image (e.g., as projected by projector 300 and incident with projection surface 400) from the captured image (e.g., the image of projection surface 400, as acquired by imaging capture device 500, and inclusive of the observable image). In some cases, and in accordance with an embodiment, image isolation module 220 may serve to cull extraneous imaging data from the captured image; that is, imaging data which is not representative of the projected image incident with projection surface 400 (e.g., imaging data pertaining to the environment immediately surrounding or otherwise proximate the observable image) may be omitted or otherwise withheld by image isolation module 220 from further processing by image comparison engine 200. In some embodiments, image isolation module 220 may be configured to compensate for the angle of imaging capture device 500 relative to projection surface 400. Other suitable configurations for image isolation module 220 will depend on a given application and will be apparent in light of this disclosure.

The resultant isolated image, as provided by image isolation module 220, can be delivered downstream to image discrepancy module 230. As will be appreciated in light of this disclosure, in some cases, the image observable on projection surface 400 may differ (e.g., in color, in resolution, in aspect ratio, etc.) from the original image data output by computing device 100 (e.g., by screen buffer 120 thereof). This may be the net result of distortive effects of any of a number of hardware and/or environmental factors. For instance, in some cases, projector 300 may be a source of distortive effects; for example, factors such as the age of the lamp utilized in projector 300, the lack of calibration of projector 300, the lack of appropriate focusing of projector 300, or the projection angle of projector 300 may impact the image observable on projection surface 400. In some cases, the ambient environment (e.g., the air or other medium through which the projected image is transmitted during transmission from projector 300 to projection surface 400) can be a source of distortive effects;

for example, the ambient light may be tinged or too intense, thereby altering the observable image. In some cases, the projection surface 400 can be a source of distortive effects; for example, the color, texture, curvature, etc., of projection surface 400 may impact the observable image. Other factors which can contribute distortive effects will be apparent in light of this disclosure.

Thus, and in accordance with an embodiment, image discrepancy module 230 may include custom, proprietary, known, and/or after-developed image/video processing code or instruction sets that are generally well-defined and operable: (1) to compare the original image data (e.g., as provided thereto by screen buffer 120) and the captured and optionally isolated image (e.g., as provided thereto by upstream image isolation module 220, discussed above); and (2) to determine discrepancies (e.g., inconsistencies in color, contrast, resolution, aspect ratio, etc.), if any, as between those imaging data sets. In some embodiments, image discrepancy module 230 may be configured to output data pertaining to image discrepancies to downstream image output module 210 for use thereby in performing adjustments to the original image data signal, as received from screen buffer 120. Thereafter, image output module 210 may deliver the new image to be projected (e.g., the original image data having one or more adjustments made thereto based on observed discrepancies) to projector 300. In turn, projector 300 may project the newly received image and, in doing so, impart distortive effect(s) on the image. Also, as the projected image is transmitted through the ambient environment, further distortive effect(s) may be imparted on the image. Additionally, upon incidence with projection surface 400, the projected image may undergo yet further distortive effect(s). In accordance with an embodiment, the corrective adjustments made by image output module 210 effectively pre-distort the image to be projected to compensate for distortions subsequently imparted on the image by projector 300, projection surface 400, and/or the ambient environment. Thus, in a sense, image output module 210 may serve, in some embodiments, to provide a corrective adjustment (e.g., a compensatory distortion) which is subsequently negated or otherwise countered by the distortive effects imparted by projector 300, projection surface 400, and/or the ambient environment. In some other embodiments, image output module 210 may serve to provide an enhancive adjustment which enhances a given attribute of the image to improve the image projected by projector 300.

The present disclosure, however, is not so limited. For instance, in some other embodiments, image discrepancy module 230 optionally may be configured to output a signal including control parameter(s), for example, to control module 310, which in turn may adjust the configuration settings of projector 300. Therefore, in some cases in which image comparison engine 200 is integrated, in part or in whole, with projector 300, control module 310 may receive the control parameters from image discrepancy module 230 and correspondingly adjust one or more settings of projector 300 directly. Conversely, in some cases in which image comparison engine 200 is integrated, in part or in whole, with computing device 100, device 100 may serve to remotely adjust one or more settings of projector 300 by way of control module 310. As will be appreciated, in such cases, communication between computing device 100 and control module 310 may be provided using any of the wired and/or wireless communications noted above with respect to computing device 100. Other suitable configurations for image discrepancy module 230 will depend on a given application and will be apparent in light of this disclosure.

Adjustments (e.g., to the imaging data and/or to the projector configuration settings) may be made, in accordance with some embodiments, to correct or otherwise compensate for discrepancies in color, resolution, aspect ratio, etc., as between the original image data and the image observable at projection surface 400. In some other cases, adjustments (e.g., to the imaging data and/or to the projector configuration settings) may be made, in accordance with some embodiments, to enhance a given attribute of the image so as to achieve a given target image quality. For instance, an adjustment may be made to enhance the contrast between text and a background image (e.g., change orange colored text on a yellow background to dark orange text on a light yellow background, or change it to black text on a white background). The type and degree of adjustment(s) may depend, in part or in whole, upon several factors, including: (1) the distortive effect(s) imparted by projector 300 during projection, as caused by lamp aging, poor calibration, misaligned projection angle, etc.; (2) the distortive effect(s) imparted by the ambient environment as the projected image is transmitted there through, as caused by the color/tinge, intensity, etc., of any ambient light; and/or (3) the distortive effect(s) imparted by the surface color, texture, curvature, etc., of the projection surface 400 with which the projected image is incident. As a result of such adjustment(s), and in accordance with some embodiments, the image observable on projection surface 400 may come to more accurately resemble the original image and/or may have one or more attributes deliberately enhanced to achieve a given target image.

Such adjustments can be made continually (e.g., throughout the course of operation of system 1000) or periodically (e.g., during startup or other setup routine for system 1000), as desired for a given target application or end-use. In an example case, one or more calibration images (e.g., an image set of designated color, resolution, aspect ratio, etc.) can be utilized in performing the adjustments, for instance, during an initial setup routine. In some cases, and in accordance with an embodiment, system 1000 may allow for extemporal or on-the-fly adjustment of the image signal and/or the settings of projector 300 to provide the desired effects (e.g., to better reproduce the original image data output by screen buffer 120; to enhance one or more attributes of the original image data to achieve a given target image quality). In a sense, system 1000 can provide for closed-loop feedback on discrepancies/differences between the actual on-screen image observable at projection surface 400 and the original image data output by computing device 100. In some cases, corrective adjustments may be performed, for example, until the image on projection surface 400 substantially matches (e.g., within a given tolerance, which may depend on a given target application or end-use) the original image in color (e.g., one or more of hue, tint, shade, tone saturation, lightness, chroma intensity, luma brightness, luminance, etc.), contrast, resolution, and/or aspect ratio. In some other cases, adjustments may be performed, for example, until the image on projection surface 400 substantially achieves (e.g., within a given tolerance, which may depend on a given target application or end-use) a given target image quality. In some instances, no adjustment may be made and thus image data pass-through may be provided.

Methodologies

Figure 2A:
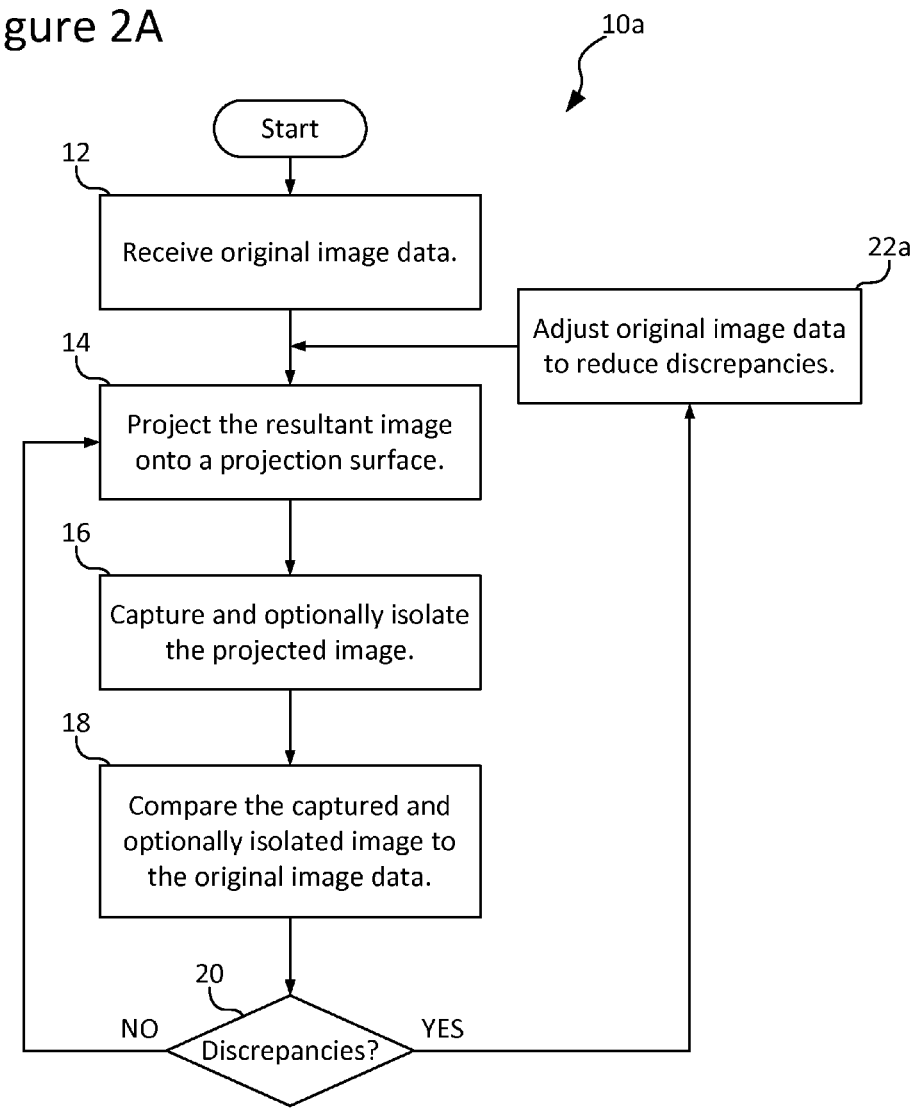
FIG. 2A is a flow diagram illustrating an algorithm for reducing projected image discrepancies, in accordance with an embodiment of the present disclosure.

FIG. 2A is a flow diagram illustrating an algorithm 10*a* for reducing projected image discrepancies, in accordance with an embodiment of the present disclosure. The algorithm 10*a* of FIG. 2A can be implemented, for example, using system 1000 (discussed above), in some embodiments. As can be seen, algorithm 10*a* may begin as in block 12 with receiving the original image data. As previously discussed, projector 300 may receive the original image data as it is output by screen buffer 120 and passed through image comparison engine 200 (e.g., through image output module 210 thereof). Next, the algorithm may proceed as in block 14 with projecting the image onto a projection surface, such as projection surface 400, discussed above. Thereafter, as in block 16, the projected image may be captured (e.g., by imaging capture device 500) and, if desired, isolated from the captured image (e.g., using image isolation module 220).

Next, as in block 18, the captured and optionally isolated image may be compared to the original image data, and discrepancies, if any, may be determined as in block 20 (e.g., as performed by image discrepancy module 230, discussed above). If the type and/or degree of discrepancies between the observable image on projection surface 400 and the original image data provided by screen buffer 120 are negligible (e.g., there is no difference or an otherwise sufficiently reduced/minimal difference), then the algorithm 10a may return to block 14 with projection of the image by projector 300 onto the projection surface 400. If instead the type and/or degree of discrepancies (e.g., difference in color, resolution, aspect ratio, etc.) between the observable image and the original image data are not negligible, then the algorithm 10a may proceed as in block 22a with adjusting the image to be projected so as to reduce one or more observable discrepancies. Reductions in discrepancies may be performed, for example, until the image on projection surface 400 substantially matches (e.g., within a given tolerance, which may depend on a given target application or end-use) the original image in color, resolution, aspect ratio, and/or other image parameter or property.

In accordance with some embodiments, the adjustment denoted with respect to block 22a can be performed in a number of ways. For example, as previously discussed, image comparison engine 200 can be incorporated, in some embodiments, as part of computing device 100. Thus, in some such cases, image output module 210 of image comparison engine 200 may make adjustments to the imaging signal on its way out of computing device 100 (e.g., to be provided to projector 300). In this example case, computing device 100 may pre-distort (e.g., via image output module 210) the outbound imaging signal to compensate for inaccuracies subsequently imparted by projector 300, projection surface 400, and/or the ambient environment. Thus, in some cases, this may allow for algorithm 10a to be implemented independent of concern regarding the projector hardware which receives the image signal.

In some other embodiments, image comparison engine 200 can be incorporated as part of projector 300, as previously discussed. Thus, in some such cases, image output module 210 of image comparison engine 200 may make adjustments to the incoming imaging signal (e.g., as received from computing device 100) before delivering it to the display hardware of projector 300 for projection thereby. In some such instances, it may be desirable to ensure that imaging capture device 500 and/or image comparison engine 200 also are integrated with (e.g., built-in or otherwise on-board) projector 300. In this example case, projector 300 may pre-distort (e.g., via image output module 210) the outbound imaging signal to compensate for inaccuracies subsequently imparted by projector 300, projection surface 400, and/or the ambient environment. Thus, in some cases, this may allow for algorithm 10a to be implemented independent of concern regarding the user's awareness or action (e.g., installation of software, modification of hardware, etc., regarding computing device 100).

It should be noted, however, that the present disclosure is not so limited to adjustments only to the imaging data signal. For instance, consider FIG. 2B, which is a flow diagram illustrating an algorithm 10b for reducing projected image discrepancies, in accordance with another embodiment of the present disclosure. The algorithm 10b of FIG. 2B can be implemented, for example, using system 1000 (discussed above), in some embodiments. As will be appreciated in light of this disclosure, and in accordance with some embodiments, the algorithm 10b of FIG. 2B can be utilized as an alternative to or in conjunction with algorithm 10a. As will be further appreciated, algorithm 10b is similar to algorithm 10a with respect to blocks 12, 14, 16, 18, and 20 (discussed above). An example difference between algorithms 10a and 10b is that, in algorithm 10b, if the type and/or degree of discrepancies (e.g., difference in color, contrast, resolution, aspect ratio, etc.) between the observable image on projection surface 400 and the original image data provided by screen buffer 120 are not negligible, then the algorithm 10b may proceed as in block 22b with adjusting the projector settings/configuration so as to reduce observable discrepancies. Reductions in discrepancies may be performed, for example, until the image on projection surface 400 substantially matches (e.g., within a given tolerance, which may depend on a given target application or end-use) the original image in color, contrast, resolution, aspect ratio, and/or other image parameter or property.

In accordance with some embodiments, the adjustment denoted with respect to block 22b can be performed in a number of ways. For example, as previously discussed, image comparison engine 200 can be incorporated, in some embodiments, as part of computing device 100. Thus, in some such cases, image discrepancy module 230 of image comparison engine 200 may output a signal, for example, to control module 310, which in turn may adjust the configuration settings of projector 300. In this example case, computing device 100 directly controls projector 300 by adjusting its settings, which in turn affects the image projected thereby. In some such instances, it may be desirable to ensure that a suitable protocol which allows for remote adjustment of projector 300 by computing device 100 is implemented there between.

In some other embodiments, image comparison engine 200 can be incorporated as part of projector 300, as previously discussed. Thus, in some such cases, image discrepancy module 230 of image comparison engine 200 may output a signal, for example, to control module 310, which in turn may adjust the configuration settings of projector 300. In this example case, projector 300 may internally self-adjust its settings, which in turn affects the image projected thereby. In some such instances, it may be desirable to ensure that imaging capture device 500 and/or image comparison engine 200 also are integrated with (e.g., built-in or otherwise on-board) projector 300.

In any case, and in accordance with some embodiments, use of the algorithm 10a of FIG. 2A (e.g., adjusting the imaging signal) and/or the algorithm 10b of FIG. 2B (e.g., adjusting the projector's settings) may provide for a reduction of observable discrepancies in color, contrast, resolution, aspect ratio, etc., as imparted by hardware (e.g., projector 300, projection surface 400) and/or environmental factors (e.g., ambient lighting). Other suitable uses for the disclosed techniques will depend on a given application and will be apparent in light of this disclosure.

FIG. 2C is a flow diagram illustrating an algorithm 10c for enhancing a projected image attribute, in accordance with an embodiment of the present disclosure. The algorithm 10c of FIG. 2C can be implemented, for example, using system 1000

(discussed above), in some embodiments. As will be appreciated in light of this disclosure, and in accordance with some embodiments, the algorithm 10c of FIG. 2C is similar to algorithm 10a with respect to blocks 12, 14, 16, and 18 (discussed above). One example difference is that, in algorithm 10c, after comparing the captured and optionally isolated image to the original image data, as in block 18, a determination may be made as to whether the desired image attribute enhancement has been achieved, as in block 21. If the desired enhancement(s) to the original image data have been achieved to a sufficient degree, then the algorithm 10c may return to block 14 with projection of the image by projector 300 onto the projection surface 400. If instead the desired enhancement(s) to the original image data have not been achieved to a sufficient degree, then the algorithm 10c may proceed as in block 22c with adjusting the image to be projected so as to achieve the desired attribute enhancement(s). Adjustment of the original image data may be performed, for example, until the image on projection surface 400 exhibits the desired enhancement(s) in color, contrast, resolution, aspect ratio, and/or other image parameter or property as compared to the original image data.

In accordance with some embodiments, the adjustment denoted with respect to block 22c can be performed in a number of ways. For example, as previously discussed, image comparison engine 200 can be incorporated, in some embodiments, as part of computing device 100. Thus, in some such cases, image output module 210 of image comparison engine 200 may make adjustments to the imaging signal on its way out of computing device 100 (e.g., to be provided to projector 300). In this example case, computing device 100 may pre-distort (e.g., via image output module 210) the outbound imaging signal to provide the desired enhanced image attribute(s). Thus, in some cases, this may allow for algorithm 10c to be implemented independent of concern regarding the projector hardware which receives the image signal.

In some other embodiments, image comparison engine 200 can be incorporated as part of projector 300, as previously discussed. Thus, in some such cases, image output module 210 of image comparison engine 200 may make adjustments to the incoming imaging signal (e.g., as received from computing device 100) before delivering it to the display hardware of projector 300 for projection thereby. In some such instances, it may be desirable to ensure that imaging capture device 500 and/or image comparison engine 200 also are integrated with (e.g., built-in or otherwise on-board) projector 300. In this example case, projector 300 may pre-distort (e.g., via image output module 210) the outbound imaging signal to provide the desired enhanced attribute(s). Thus, in some cases, this may allow for algorithm 10c to be implemented independent of concern regarding the user's awareness or action (e.g., installation of software, modification of hardware, etc., regarding computing device 100).

It should be noted, however, that the present disclosure is not so limited to adjustments only to the imaging data signal. For instance, consider FIG. 2D, which is a flow diagram illustrating an algorithm 10d for enhancing a projected image attribute, in accordance with another embodiment of the present disclosure. The algorithm 10d of FIG. 2D can be implemented, for example, using system 1000 (discussed above), in some embodiments. As will be appreciated in light of this disclosure, and in accordance with some embodiments, the algorithm 10d of FIG. 2D can be utilized as an alternative to or in conjunction with algorithm 10c. As will be further appreciated, algorithm 10d is similar to algorithm 10c with respect to blocks 12, 14, 16, 18, and 21 (discussed above). An example difference between algorithms 10c and 10d is that, in algorithm 10d, if the desired enhancement(s) to the original image data have not been achieved to a sufficient degree, then the algorithm 10d may proceed as in block 22d with adjusting the projector settings/configuration so as to achieve the desired attribute enhancement(s). Adjustment of the original image data may be performed, for example, until the image on projection surface 400 exhibits the desired enhancement(s) in color, contrast, resolution, aspect ratio, and/or other image parameter or property as compared to the original image data.

In accordance with some embodiments, the adjustment denoted with respect to block 22d can be performed in a number of ways. For example, as previously discussed, image comparison engine 200 can be incorporated, in some embodiments, as part of computing device 100. Thus, in some such cases, image discrepancy module 230 of image comparison engine 200 may output a signal, for example, to control module 310, which in turn may adjust the configuration settings of projector 300. In this example case, computing device 100 directly controls projector 300 by adjusting its settings, which in turn affects the image projected thereby. In some such instances, it may be desirable to ensure that a suitable protocol which allows for remote adjustment of projector 300 by computing device 100 is implemented there between.

In some other embodiments, image comparison engine 200 can be incorporated as part of projector 300, as previously discussed. Thus, in some such cases, image discrepancy module 230 of image comparison engine 200 may output a signal, for example, to control module 310, which in turn may adjust the configuration settings of projector 300. In this example case, projector 300 may internally self-adjust its settings, which in turn affects the image projected thereby. In some such instances, it may be desirable to ensure that imaging capture device 500 and/or image comparison engine 200 also are integrated with (e.g., built-in or otherwise on-board) projector 300.

In any case, and in accordance with some embodiments, use of the algorithm 10c of FIG. 2C (e.g., adjusting the imaging signal) and/or the algorithm 10d of FIG. 2D (e.g., adjusting the projector's settings) may provide for achieving a desired enhancement in color, contrast, resolution, aspect ratio, etc., as compared with the original image data. Other suitable uses for the disclosed techniques will depend on a given application and will be apparent in light of this disclosure.

Example System

Figure 3:
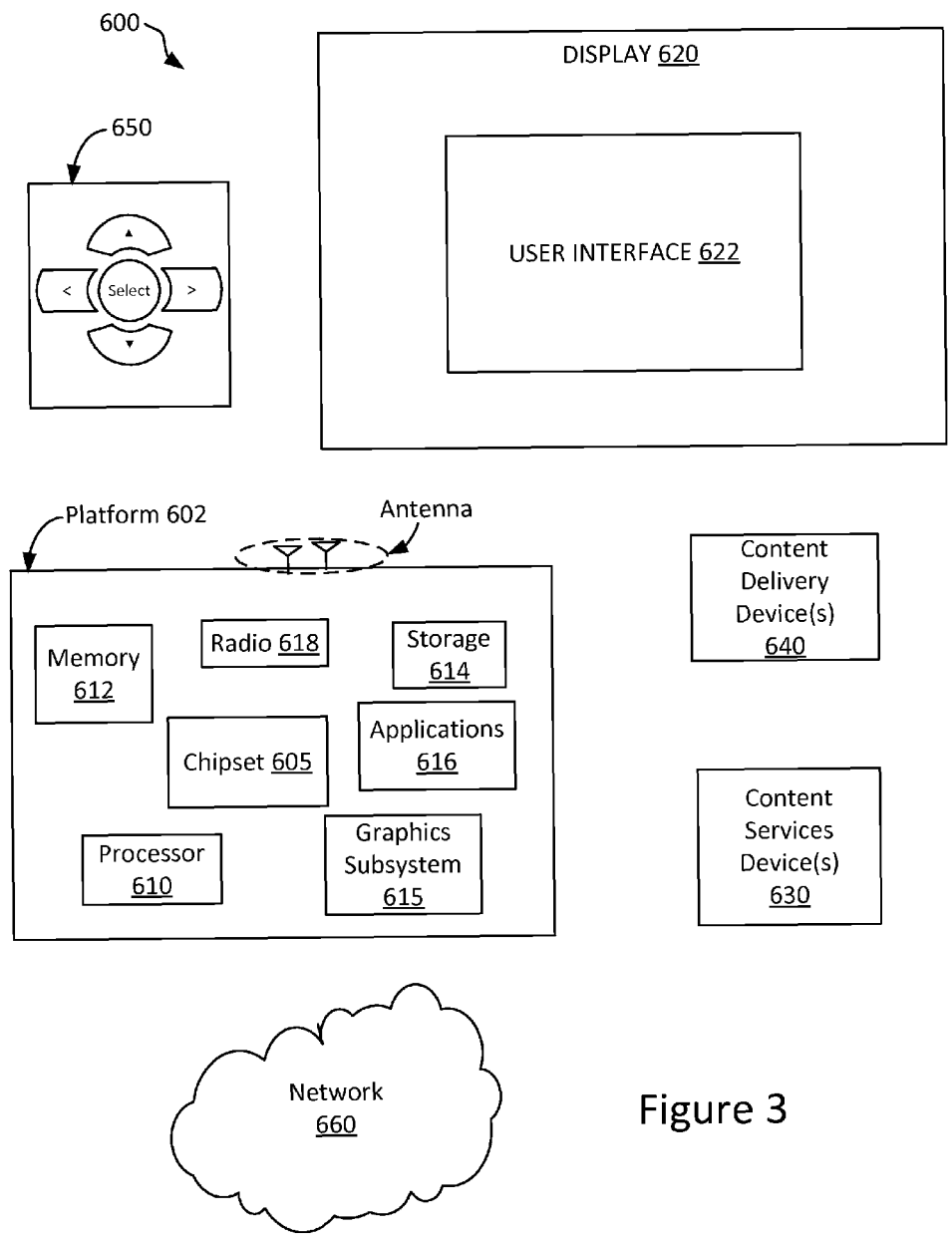
FIG. 3 illustrates an example system that may carry out the techniques for real-time projected image adjustment as described herein, in accordance with some embodiments.

FIG. 3 illustrates an example system 600 that may carry out the techniques for real-time projected image adjustment as described herein, in accordance with some embodiments. In some embodiments, system 600 may be a media system, although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact, for example, with platform 602 and/or display 620. Each of these example components is described in more detail below.

In some embodiments, platform 602 may comprise any combination of a chipset 605, processor 610, memory 612, storage 614, graphics subsystem 615, applications 616, and/or radio 618. Chipset 605 may provide intercommunication among processor 610, memory 612, storage 614, graphics subsystem 615, applications 616, and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface (HDMI), DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The techniques for real-time projected image adjustment described herein may be implemented in various hardware architectures. For example, the techniques for real-time projected image adjustment as provided herein may be integrated within a graphics and/or video chipset. Alternatively, a discrete security processor may be used. In still another embodiment, the graphics and/or video functions including the techniques for real-time projected image adjustment may be implemented by a general purpose processor, including a multi-core processor.

Radio 618 may include one or more radios capable of transmitting and receiving signals using various suitable wireless communications techniques. Such techniques may involve communications across one or more wireless networks. Exemplary wireless networks may include, but are not limited to, wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer-type monitor or display. Display 620 may comprise, for example, a liquid crystal display (LCD) screen, electrophoretic display (EPD) or liquid paper display, flat panel display, touchscreen display, television-like device, and/or a television. Display 620 may be digital and/or analog. In some embodiments, display 620 may be a holographic or three-dimensional (3-D) display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display a user interface 622 on display 620.

In some embodiments, content services device(s) 630 may be hosted by any national, international, and/or independent service and thus may be accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer (PC), network, telephone, Internet-enabled devices or appliance capable of delivering digital information and/or content, and any other similar device capable of unidirectionally or bi-directionally communicating content between content providers and platform 602 and/or display 620, via network 660 or directly. It will be appreciated that the content may be communicated unidirectionally and/or bi-directionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI) and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 716, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off" In addition, chip set 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the radio frequency (RF) spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions, or control words meant for an automated system. For example, control information may be used to route media information through a system or instruct a node to process the media information in a predetermined manner (e.g., using the techniques for real-time projected image adjustment as described herein). The embodiments, however, are not limited to the elements or context shown or described in FIG. 3.

Figure 4:
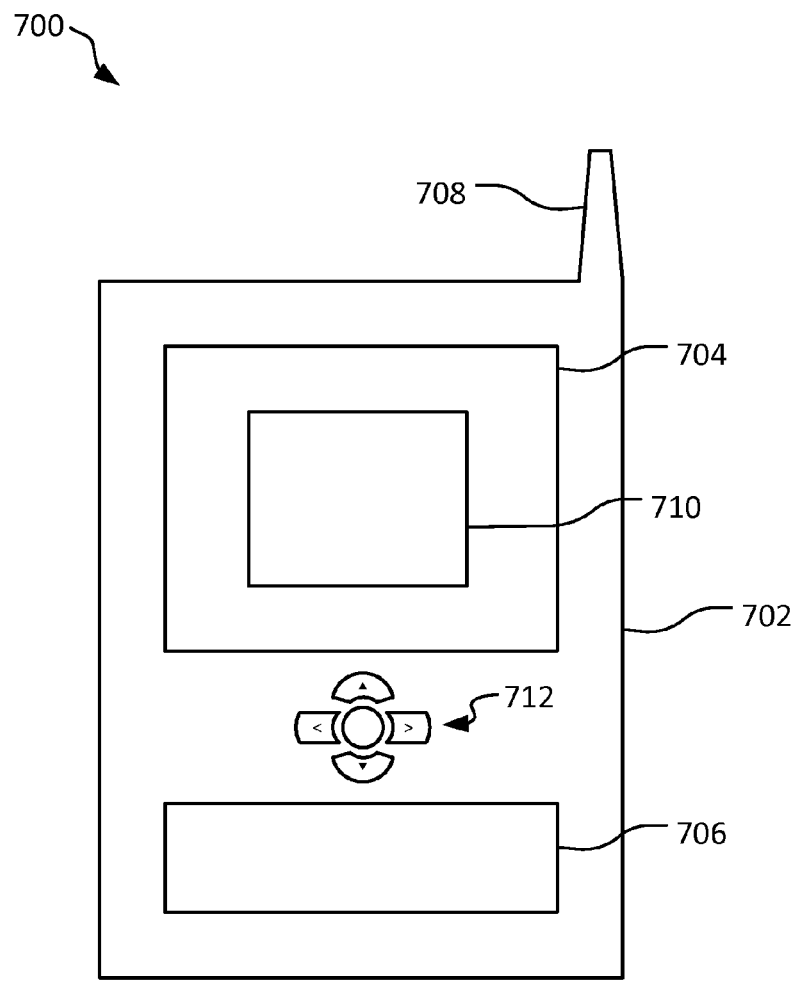
FIG. 4 illustrates embodiments of a small form factor device in which the system of FIG. 3 may be embodied.

As described above, system 600 may be embodied in varying physical styles or form factors. FIG. 4 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 4, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits (IC), application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds, and other design or performance constraints.

Some embodiments may be implemented, for example, using a machine-readable medium or article which may store an instruction or a set of instructions that, if executed by a machine, may cause the machine to perform a method and/or operations in accordance with an embodiment. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled, and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers, or other such information storage, transmission, or displays. The embodiments are not limited in this context.

Further Example Embodiments

The following examples pertain to further embodiments, from which numerous permutations and configurations will be apparent.

Example 1 is an image comparison device comprising: an image discrepancy module configured to compare projected image data with target image data, the projected image data resulting from an output of a projector; and an image output module configured to adjust at least one of original image data input to the projector and/or one or more control parameters of the projector, if the comparison by the image discrepancy module indicates a correctable discrepancy between the projected image data and the target image data, so as to reduce the correctable discrepancy, the image output module further configured to output the adjusted original image data and/or the adjusted one or more control parameters to the projector.

Example 2 includes the subject matter of any of Examples 1 and 3-18, wherein the image output module is configured to adjust the original image data so that the projected image data more closely matches the original image data.

Example 3 includes the subject matter of any of Examples 1-2 and 4-18, wherein the image output module is configured to adjust the one or more control parameters of the projector so that the projected image data more closely matches the original image data.

Example 4 includes the subject matter of Example 3, wherein the output of the image output module comprises the original image data and a control signal for adjusting one of the one or more control parameters of the projector.

Example 5 includes the subject matter of any of Examples 1-4 and 6-18, wherein the correctable discrepancy between the projected image data and the target image data pertains to at least one of image color, image contrast, image resolution, and/or image aspect ratio.

Example 6 includes the subject matter of Example 5, wherein the device is configured to reduce the correctable discrepancy between the projected image data and the target image data in real time during a projection session.

Example 7 includes the subject matter of any of Examples 1-6 and 8-18, wherein the image output module is configured to adjust the original image data input to the projector so that the projected image data exhibits an enhanced image attribute as compared to the original image data.

Example 8 includes the subject matter of any of Examples 1-7 and 9-18, wherein the image output module is configured to adjust the one or more control parameters of the projector so that the projected image data exhibits an enhanced image attribute as compared to the original image data.

Example 9 includes the subject matter of Example 8, wherein the output of the image output module comprises the original image data and a control signal for adjusting one of the one or more control parameters of the projector.

Example 10 includes the subject matter of any of Examples 1-9 and 11-18, wherein reduction of the correctable discrepancy results in the projected image data exhibiting an enhanced image attribute as compared to the original image data, the enhanced image attribute pertaining to at least one of image color, image contrast, image resolution, and/or image aspect ratio.

Example 11 includes the subject matter of Example 10, wherein the device is configured to reduce the correctable discrepancy between the projected image data and the target image data in real time during a projection session.

Example 12 is a computing system comprising the image comparison device of any of Examples 1-11.

Example 13 is a projector comprising the image comparison device of any of Examples 1-11.

Example 14 is a projection system comprising: a computing device configured to provide the original image data; the image comparison device of any of Examples 1-11; and a projector, wherein the projector is configured to receive the output from the image output module.

Example 15 includes the subject matter of any of Examples 14 and 16-18 and further includes an imaging capture device configured to capture the projected image data.

Example 16 includes the subject matter of Example 15, wherein the imaging capture device comprises a still camera or a video camera.

Example 17 includes the subject matter of any of Examples 14-16 and 18, wherein the image comparison device is integrated into at least one of the computing device and/or the projector.

Example 18 includes the subject matter of any of Examples 14-17, wherein the original image data comprises one or more calibration images configured to calibrate the projector.

Example 19 is a method of adjusting a projected image, the method comprising: receiving original image data; outputting projected image data based on the original image data; capturing an image inclusive of the projected image data; comparing the resultant captured image data with target image data; and adjusting the projected image data, if the comparison indicates a correctable discrepancy between the projected image data and the target image data, so as to reduce the correctable discrepancy.

Example 20 includes the subject matter of any of Examples 19 and 21-31, wherein adjusting the projected image data comprises: adjusting the original image data so that the projected image data more closely matches the original image data.

Example 21 includes the subject matter of any of Examples 19-20 and 22-31, wherein outputting the projected image data is performed by a projector, and wherein adjusting the projected image data comprises: adjusting one or more control parameters of the projector so that the projected image data more closely matches the original image data.

Example 22 includes the subject matter of any of Examples 19-21 and 23-31, wherein the correctable discrepancy between the projected image data and the target image data pertains to at least one of image color, image contrast, image resolution, and/or image aspect ratio.

Example 23 includes the subject matter of Example 22, wherein reducing the correctable discrepancy between the projected image data and the target image data is performed in real time during a projection session.

Example 24 includes the subject matter of any of Examples 19-23 and 25-31, wherein adjusting the projected image data comprises: adjusting the original image data so that the projected image data exhibits an enhanced image attribute as compared to the original image data.

Example 25 includes the subject matter of any of Examples 19-24 and 26-31, wherein outputting the projected image data is performed by a projector, and wherein adjusting the projected image data comprises: adjusting one or more control parameters of the projector so that the projected image data exhibits an enhanced image attribute as compared to the original image data.

Example 26 includes the subject matter of any of Examples 19-25 and 27-31, wherein adjusting the projected image data results in the projected image data exhibiting an enhanced image attribute as compared to the original image data, the enhanced image attribute pertaining to at least one of image color, image contrast, image resolution, and/or image aspect ratio.

Example 27 includes the subject matter of Example 26, wherein reducing the correctable discrepancy between the projected image data and the target image data is performed in real time during a projection session.

Example 28 includes the subject matter of any of Examples 19-27 and 29-31, wherein outputting the projected image data is performed by a projector, and wherein the original image data comprises one or more calibration images configured to calibrate the projector.

Example 29 includes the subject matter of any of Examples 19-28 and 30-31, wherein adjusting the projected image data improves at least one of color matching, contrast matching, resolution matching, and/or aspect ratio matching between the projected image data and the target image data.

Example 30 includes the subject matter of any of Examples 19-29 and 31, wherein capturing the image inclusive of the projected image data is performed by a still camera or a video camera.

Example 31 includes the subject matter of any of Examples 19-30, wherein the original image data is provided by a computing device.

Example 32 is a computer-readable medium encoded with instructions that, when executed by one or more processors, causes a process for adjusting a projected image to be carried out, the process comprising the subject matter of any of Examples 19-31.

Example 33 is a projection system comprising: a computing device configured to output original image data; an image comparison device configured to receive the original image data and to provide an output; a projector configured to receive the output of the image comparison device and to output projected image data based thereon; and a camera configured to capture an image inclusive of the projected image data; wherein the image comparison device is further configured to compare the resultant captured image data with target image data and to adjust at least one of the original image data and/or one or more control parameters of the projector, if the comparison indicates a correctable discrepancy between the projected image data and the target image data, so as to reduce the correctable discrepancy, the image comparison device further configured to output the adjusted original image data and/or the adjusted one or more control parameters to the projector.

Example 34 includes the subject matter of any of Examples 33 and 35-43, wherein the image comparison device is configured to adjust the original image data so that the projected image more closely matches the original image data.

Example 35 includes the subject matter of any of Examples 33-34 and 36-43, wherein the image comparison device is configured to adjust the one or more control parameters of the projector so that the projected image data more closely matches the original image data.

Example 36 includes the subject matter of any of Examples 33-35 and 37-43, wherein the output of the image comparison device comprises the original image data and a control signal for adjusting one of the one or more control parameters of the projector.

Example 37 includes the subject matter of any of Examples 33-36 and 38-43, wherein the correctable discrepancy between the projected image data and the target image data pertains to at least one of image color, image contrast, image resolution, and/or image aspect ratio.

Example 38 includes the subject matter of any of Examples 33-37 and 39-43, wherein the image comparison device is configured to reduce the correctable discrepancy between the projected image data and the target image data in real time during a projection session.

Example 39 includes the subject matter of any of Examples 33-38 and 40-43, wherein the image comparison device is configured to adjust the original image data so that the projected image data exhibits an enhanced image attribute as compared to the original image data.

Example 40 includes the subject matter of any of Examples 33-39 and 41-43, wherein the image comparison device is configured to adjust the one or more control parameters of the projector so that the projected image data exhibits an enhanced image attribute as compared to the original image data.

Example 41 includes the subject matter of any of Examples 33-40 and 42-43, wherein reduction of the correctable discrepancy results in the projected image data exhibiting an enhanced image attribute as compared to the original image data, the enhanced image attribute pertaining to at least one of image color, image contrast, image resolution, and/or image aspect ratio.

Example 42 includes the subject matter of any of Examples 33-41 and 43, wherein the image comparison device is configured to reduce the correctable discrepancy between the projected image data and the target image data in real time during a projection session.

Example 43 includes the subject matter of any of Examples 33-42, wherein the original image data comprises one or more calibration images configured to calibrate the projector.

Example 44 includes the subject matter of any of Examples 33-43, wherein the image comparison device is integrated into the computing device.

Example 45 includes the subject matter of any of Examples 33-43, wherein the image comparison device is integrated into the projector.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as various disclosed or otherwise demonstrated herein.

What is claimed is:

1. An image comparison device comprising:
   an image discrepancy module configured to compare projected image data with target image data, the projected image data resulting from an output of a projector; and
   an image output module configured to:
      adjust at least one of original image data input to the projector and one or more control parameters of the projector, if the comparison by the image discrepancy module indicates a correctable discrepancy with respect to image color between the projected image data and the target image data, so as to reduce the correctable image color discrepancy; and
      output at least one of the adjusted original image data and the adjusted one or more control parameters to the projector.

2. The image comparison device of claim 1, wherein the image output module is configured to adjust the original image data so that the projected image data more closely matches the original image data with respect to at least one of hue, tint, shade, tone saturation, lightness, chroma intensity, luma brightness, and luminance.

3. The image comparison device of claim 1, wherein the image output module is configured to adjust the one or more control parameters of the projector so that the projected image data more closely matches the original image data with respect to at least one of hue, tint, shade, tone saturation, lightness, chroma intensity, luma brightness, and luminance.

4. The image comparison device of claim 3, wherein the output of the image output module comprises the original image data and a control signal for adjusting one of the one or more control parameters of the projector.

5. The image comparison device of claim 1, wherein the device is configured to reduce the correctable image color discrepancy between the projected image data and the target image data in real time during a projection session.

6. The image comparison device of claim 1, wherein the image output module is configured to adjust the original image data input to the projector so that as compared to the original image data, the projected image data exhibits an enhanced image attribute with respect to at least one of hue, tint, shade, tone saturation, lightness, chroma intensity, luma brightness, and luminance.

7. The image comparison device of claim 1, wherein the image output module is configured to adjust the one or more control parameters of the projector so that, as compared to the original image data, the projected image data exhibits an enhanced image attribute with respect to at least one of hue, tint, shade, tone saturation, lightness, chroma intensity, luma brightness, and luminance.

8. The image comparison device of claim 7, wherein the output of the image output module comprises the original image data and a control signal for adjusting one of the one or more control parameters of the projector.

9. A computing system comprising the image comparison device of claim 1.

10. A projector comprising the image comparison device of claim 1.

11. A projection system comprising:
    a computing device configured to provide the original image data;
    the image comparison device of claim 1; and
    a projector, wherein the projector is configured to receive the output from the image output module.

12. The projection system of claim 11 further comprising an imaging capture device configured to capture the projected image data, wherein the imaging capture device comprises a still camera or a video camera.

13. The projection system of claim 11, wherein the image comparison device is integrated into at least one of the computing device and the projector.

14. The projection system of claim 11, wherein the original image data comprises one or more calibration images configured to calibrate the projector.

15. A non-transitory computer-readable medium encoded with instructions that, when executed by one or more processors, causes a process for adjusting a projected image to be carried out, the process comprising:
    receiving original image data;
    outputting projected image data based on the original image data;
    capturing an image inclusive of the projected image data;
    comparing the resultant captured image data with target image data; and
    adjusting the projected image data, if the comparison indicates a correctable discrepancy with respect to image color between the projected image data and the target image data, so as to reduce the correctable image color discrepancy.

16. The non-transitory computer-readable medium of claim 15, wherein adjusting the projected image data comprises at least one of:
    adjusting the original image data so that the projected image data more closely matches the original image data with respect to at least one of hue, tint, shade, tone saturation, lightness, chroma intensity, luma brightness, and luminance; and
    adjusting the original image data so that, as compared to the original image data, the projected image data exhibits an enhanced image attribute with respect to at least one of hue, tint, shade, tone saturation, lightness, chroma intensity, luma brightness, and luminance.

17. The non-transitory computer-readable medium of claim 15, wherein outputting the projected image data is performed by a projector, and wherein adjusting the projected image data comprises at least one of:
    adjusting one or more control parameters of the projector so that the projected image data more closely matches the original image data with respect to at least one of hue, tint, shade, tone saturation, lightness, chroma intensity, luma brightness, and luminance; and
    adjusting one or more control parameters of the projector so that, as compared to the original image data, the projected image data exhibits an enhanced image attribute with respect to at least one of hue, tint, shade, tone saturation, lightness, chroma intensity, luma brightness, and luminance.

18. The non-transitory computer-readable medium of claim 15, wherein reducing the correctable image color discrepancy between the projected image data and the target image data is performed in real time during a projection session.

19. The non-transitory computer-readable medium of claim 15, wherein outputting the projected image data is performed by a projector, and wherein the original image data comprises one or more calibration images configured to calibrate the projector.

20. The non-transitory computer-readable medium of claim 15, wherein capturing the image inclusive of the projected image data is performed by a still camera or a video camera.

21. The non-transitory computer-readable medium of claim 15, wherein the original image data is provided by a computing device.

22. A projection system comprising:
a computing device configured to output original image data;
an image comparison device configured to receive the original image data and to provide an output;
a projector configured to receive the output of the image comparison device and to output projected image data based thereon; and
a camera configured to capture an image inclusive of the projected image data;
wherein the image comparison device is further configured to:
compare the resultant captured image data with target image data and to adjust at least one of the original image data and one or more control parameters of the projector, if the comparison indicates a correctable discrepancy with respect to image color between the projected image data and the target image data, so as to reduce the correctable image color discrepancy; and
output at least one of the adjusted original image data and the adjusted one or more control parameters to the projector.

23. The projection system of claim 22, wherein the image comparison device is configured to at least one of:
adjust the original image data so that the projected image more closely matches the original image data with respect to at least one of hue, tint, shade, tone saturation, lightness, chroma intensity, luma brightness, and luminance;
adjust the one or more control parameters of the projector so that the projected image data more closely matches the original image data with respect to at least one of hue, tint, shade, tone saturation, lightness, chroma intensity, luma brightness, and luminance;
adjust the original image data so that, as compared to the original image data, the projected image data exhibits an enhanced image attribute with respect to at least one of hue, tint, shade, tone saturation, lightness, chroma intensity, luma brightness, and luminance; and
adjust the one or more control parameters of the projector so that, as compared to the original image data, the projected image data exhibits an enhanced image attribute with respect to at least one of hue, tint, shade, tone saturation, lightness, chroma intensity, luma brightness, and luminance.

24. The projection system of claim 22, wherein the image comparison device is configured to reduce the correctable image color discrepancy between the projected image data and the target image data in real time during a projection session.

25. The projection system of claim 22, wherein in adjusting at least one of the original image data and one or more control parameters of the projector, the image comparison device provides a compensatory distortion that is subsequently countered by a distortive effect imparted by at least one of the projector, a projection surface, and an ambient environment.

* * * * *